Oct. 25, 1960

K. FEARNSIDE 2,957,988

AMPLIFIER SYSTEM FOR RADIOACTIVE MONITOR

Filed Nov. 16, 1953

INVENTOR
Kenneth Fearnside,
BY Pierce, Scheffler + Parker
ATTORNEYS.

United States Patent Office 2,957,988
Patented Oct. 25, 1960

2,957,988
AMPLIFIER SYSTEM FOR RADIOACTIVE MONITOR

Kenneth Fearnside, London, England, assignor, by mesne assignments, to Industrial Machinery Company Limited, London, England, a firm Filed Nov. 16, 1953, Ser. No. 392,427

7 Claims. (Cl. 250—71.5)

This invention relates to amplifiers and like thermionic valve apparatus and also to systems incorporating or suitable for use in connection with radioactive materials.

The increasing use of radioactive materials for indicating, measuring or control apparatus demonstrates the need for means whereby the intensity of radiation can be indicated or measured to a high degree of accuracy; in some cases the accuracy is higher than the intrinsic accuracy of the apparatus employed. For example, where fast counting of radioactive particles is required, using "counting" in the now accepted sense of producing a current or voltage which is a function of the number or energy of the particles, a scintillation counter is often used. Such a counter employs a phosphor upon which the particles or quanta impinge, producing flashes of light which are arranged to fall onto the cathode of the photo-multiplier tube. The photo-multiplier tube produces for each flash a small pulse of current in its output which is subsequently amplified and with suitable precautions the amplitudes of such pulses can be made proportional to the energy absorbed from the rays which cause the pulses. In this case the relative amplitudes of the pulses are proportional to the energy releases which cause them, but their absolute magnitudes may vary by as much as 3% in a matter of minutes. This variation is due to a variety of factors, such as the temperature of the crystal, the tempera ture of the photo-multiplier and the H.T. voltage applied to the multiplier.

An error of this order may be greater than the variation of intensity of the radiation which it is desired to detect, and this is a serious limitation upon the use of apparatus of this kind. The present invention is concerned with the provision of means whereby a higher accuracy is attainable.

In accordance with the present invention the gain of the amplifier is controlled in accordance with an output of the amplifier which is a function of the variation of gain of the amplifier. Such an output can be obtained in various ways, but in the preferred arrangement in accordance with the invention the radiation of which the intensity is under examination is permitted to fall upon a counter; in addition a monitor radiation is also permitted to fall upon a counter (most advantageously, the same counter) and the counter outputs are applied after such amplification as may be necessary to a discriminator. By arranging that the monitor radiation is of an energy level distinguishably different from that of the radiation under examination and is substantially constant, the output of the discriminator will be a function of the overall sensitivity of the system. The output of the discriminator can therefore be used to control automatically the sensitivity for example by controlling the gain of the amplifiers used. By this means it is possible to attain a system of much more constant sensitivity, whereby an improvement of accuracy becomes possible.

The functioning of the apparatus of the invention may be better understood by reference to a specific example using, as is preferred, alpha particles as the monitor radiation, in conjunction with the accompanying drawings, in which.

Figure 1:
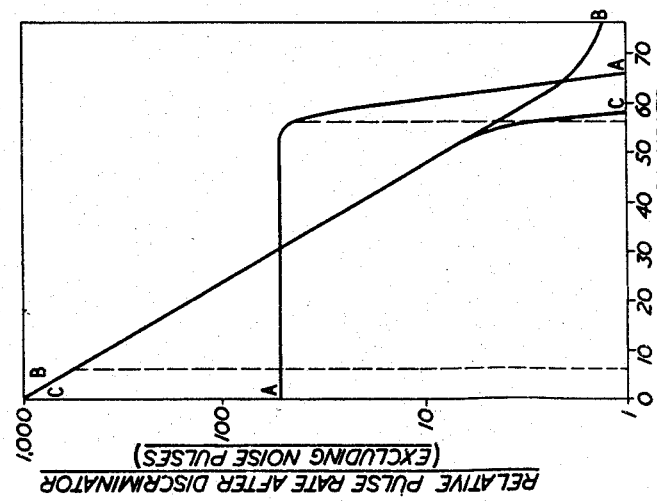
Figure 1 is a diagram indicating the relation between the relative pulse rates at the output of a discriminator, for alpha and beta-radiation.
Figure 2:
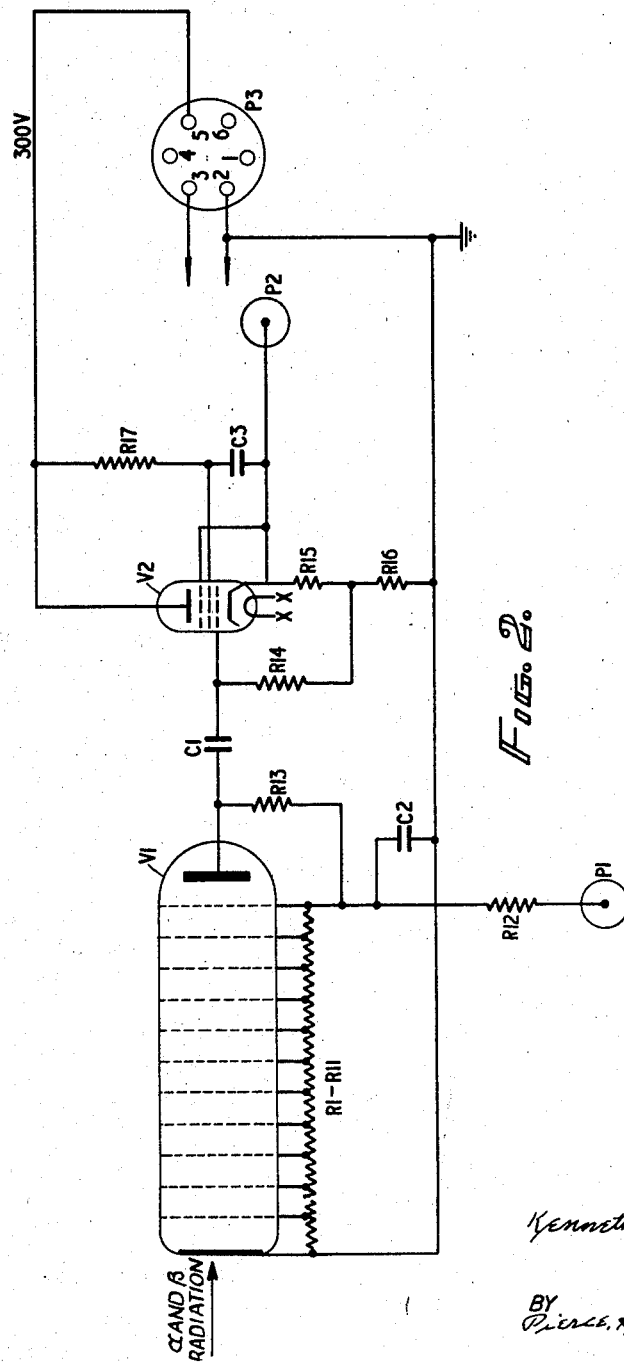

In Figure 1 the curve A shows the relation between the number of pulses due to alpha-particles passed by a conventional arrangement of counter, amplifier and discriminator, for a given setting of the discriminator voltage. It will be seen that the curve is substantially flat over an extended range of discriminator volts of up to about 55 volts in this case that is, the number of pulses passed are constant over this range. The curve then turns and eventually drops sharply, so that for a higher voltage setting the output from the discriminator is low, or negligible. The reason for the nature of this curve is that the alpha particles are initially mono-energetic. It is this fact that makes alpha particles very suitable for use as the monitor radiation for the purpose of the present invention.

The corresponding curve B for beta radiation shows an approximately regular logarithmic fall of output for linear increase of discriminator voltage in this case up to about 60 volts, but for high voltage the negative slope of the curve decreases. The normal discriminator voltage as shown is much lower than the voltage at which the alpha curve turns over.

In the specific example of the invention which will now be described, a scintillation counter is used for the detection of beta radiation, and a small alpha source is arranged to irradiate the crystal of the counter, which may be an organic crystal such as anthracene or naphthalene, an inorganic crystal such as sodium iodide with a small proportion of thallium iodide or in some cases a liquid or plastic suspension containing other materials. The material is placed adjacent the cathode of a photo-multiplier, VI, Figure 2, to the successive anodes of which appropriate potentials are applied from a source applied to terminal P1. The output from the multiplier tube is applied to a cathode follower head amplifier valve V2, so that the counter can be located remotely from the main apparatus, the cathode follower output appearing at terminal P2.

Figure 3:
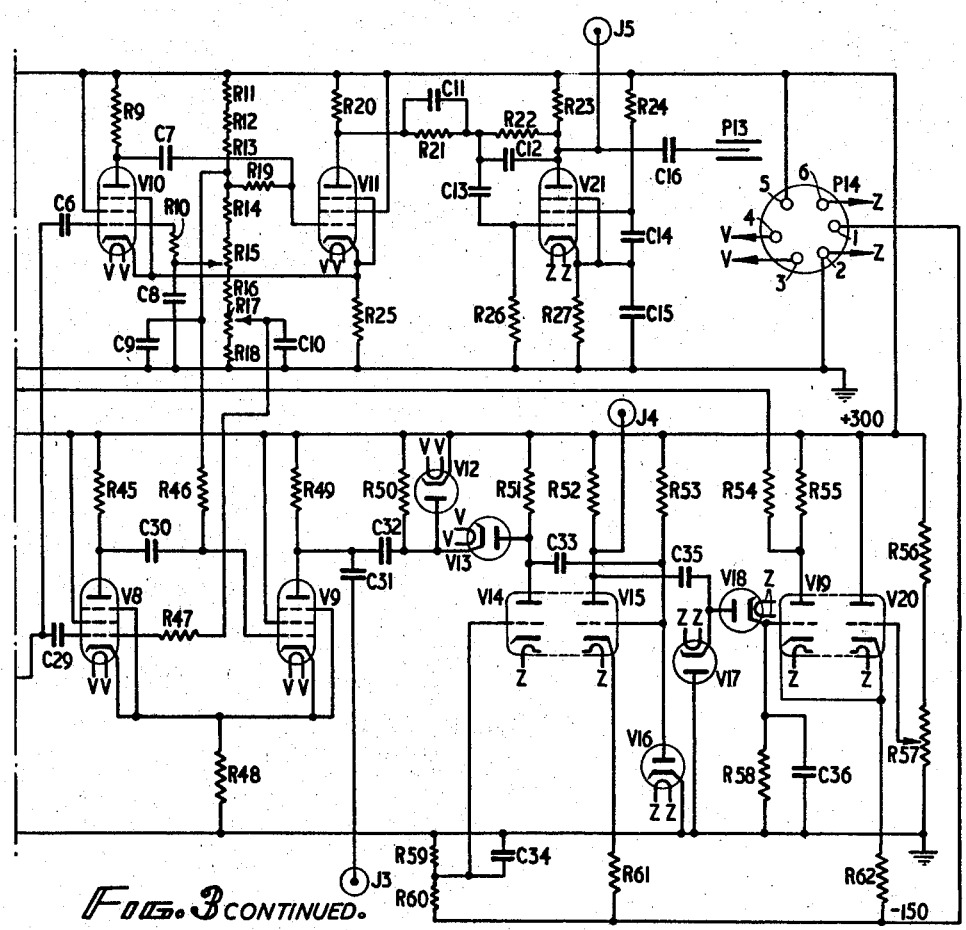
Figure 3 is a partly simplified circuit diagram of a combined pulse amplifier and discriminator.

The output from terminal P2 of the cathode follower is applied over the shielded cable P12 to the input of a four stage amplifier comprising valves V3 to V6, Fig. 3. Of these, the valve V3 is of the variable-mu type; the pentode valves V4, V5 and V6 form an amplifier the gain of which is largely stablised by a resistance R36 common to the cathode circuits of valves V4 and V6. It will be recognised that appropriate coupling, decoupling and current feed elements are incorporated in each. Though stabilized by the negative feed back, the gain of the amplifier including valves V3 to V6 is subject to variations of gain greater than variations in the intensity of radiation incident upon the scintillation counter. For a purpose to be referred to hereinafter the cathode current for valve V3 passes through a voltage stabilizing tube V7.

The output from the last amplifier valve V6 is applied in parallel to two similar discriminator stages, the first of which comprises valves V8, V9, and the second V10, V11. The screened pentode valve V8 has a load resistance R48 in its cathode circuit and a further load resistance R45 in its anode circuit; the control grid is biased by being returned to a positive point on a potential divider formed by resistors R11 to R18. The valve V8 is coupled to the valve V9 both from its anode to the control grid of valve V9 and is also cathode coupled by the cathode resistor R48. Normally the anode current of the valve V8 is cut off and valve V9 is conducting; when a sufficiently large positive-going pulse is applied to the control grid of the valve V8 valve V9 receives a negative-going pulse which reduces its anode current and thus decreases the current in the common cathode resistor R48. The cathode of valve V8 becomes less positive and the pulse voltage is supplemented; thus there is a "clean" operation of the discriminator, pulses of amplitude near the critical level being either definitely passed, or entirely suppressed. The discriminator formed by valves V10, V11 operates in the same way as that described except that the two discriminator levels are substantially different, the first level (the beta level) being about 6 volts, while the second (the alpha level) is about 56 volts.

The pulses which appear at the output of the amplifier V6 and representing the alpha pulses will all lie within two limits of amplitude and will have an approximately Gaussian distribution within those limits. If, however, the amplifier gain, or the sensitivity of the counter varies, then the value of the limits will vary. If the discriminator is set at a mean value as indicated in Figure 1, the number of pulses which pass the discriminator will be a function of the counter sensitivity and amplifier gain.

In accordance with the invention the amplifier gain is controlled in accordance with the number of pulses passed by the alpha discriminator. Since it is in general more convenient to use a voltage to control amplifier gain, a voltage is derived the value of which is proportional to the number of pulses. With this object, the output of the discriminator valve V9 is fed through a double diode circuit to a pulse shaping stage and a so-called diode pump to an integrator. There is included a charging circuit consisting of a small capacitor C32 and a resistor R50 in series shunting the anode load resistance R49 of the valve V9 of the alpha discriminator; the resistor is shunted by diode valve V12 connected with its cathode to the anode supply, and a second diode V13 is included in series in the path to the succeeding stage. This diode V13 is in the reverse direction, its cathode being connected to the capacitor C32. The operation of the circuit is that when a negative-going pulse appears at the anode of the discriminator valve V9 the diode V12 presents a low impedance and the diode V13 a high impedance so that the capacitor C32 rapidly charges to the peak pulse value; when the pulse voltage is positive-going the capacitor C32 can discharge through V13 which at that time presents a low impedance.

The output pulses thus produced are applied to a trigger shaping circuit consisting of a cathode coupled monostable multivibrator. This multivibrator includes the two triode valves V14 and V15, and also a diode valve V16 which is arranged as a clamp to prevent the grid of valve V15 rising to a potential substantially above zero. The pulses from the diode circuit, applied to the anode of valve V14, each cause the multivibrator to produce a square output pulse of constant amplitude and duration. These output square waves are applied through a diode pump consisting of diode valves V17, V18 to a charging capacitor C36, shunted by a discharge resistor R58, so that the voltage on the capacitor is then directly proportional to the number of pulses passed by the alpha-discriminator. The time constant of the discharge circuit of the capacitor is made comparatively long, of the order of .4 second in this example.

The voltage on the capacitor is applied to an amplifier stage consisting of a pair of valves V19, V20, having a common cathode resistor R62. The integrated voltage appearing on capacitor C36 is applied to the grid of valve V19, and the anode of this valve is connected over resistor R54 to the suppressor grid of valve V3, to control the gain of that valve. The control grid potential of valve V20 is adjustable by means of a potential divider comprising resistor R56 and lapped resistor R57. Variation of the grid potential of valve V20 by means of resistor R57 varies the anode current in that valve, and hence the voltage developed across resistor R62; this in turn controls the control grid potential of valve V19, whereby the potential of the anode of this valve, and also the suppressor grid potential of valve V3, can be adjusted.

In this way the gain of the valve amplifier V3 to V6 can be controlled to maintain a nearly constant output and since the alpha radiation is constant the effect is that the system as a whole is of constant sensitivity for the beta particles. By such an arrangement it has been found possible to produce an overall stability of the system of the order of a half percent, despite the intrinsic three percent variation of the counter.

The output of the beta discriminator including valve V10, V11, can be employed as desired. In this particular example the pulses are applied to an anode-follower phase inverting valve V21, from which the output is fed to cable P13. Suitable power supplies are fed to plug socket P14.

For setting up and test purposes a running multivibrator is incorporated the pulses from which can be switched to the input of the amplifier. This multivibrator includes valves V22, V23, connected as a cathode coupled multivibrator; the output is obtained through capacitor C3, and a diode valve V24 is used to suppress any positive-going output pulse. A switch S1 is used to control this multivibrator, its contacts S1/1 being used to connect the test pulses to the input of amplifier valve V3 and contacts S1/2 to control the supply of anode current to valves V22 and V23. Various test jack points J1 to J5 are also provided.

Figure 2:
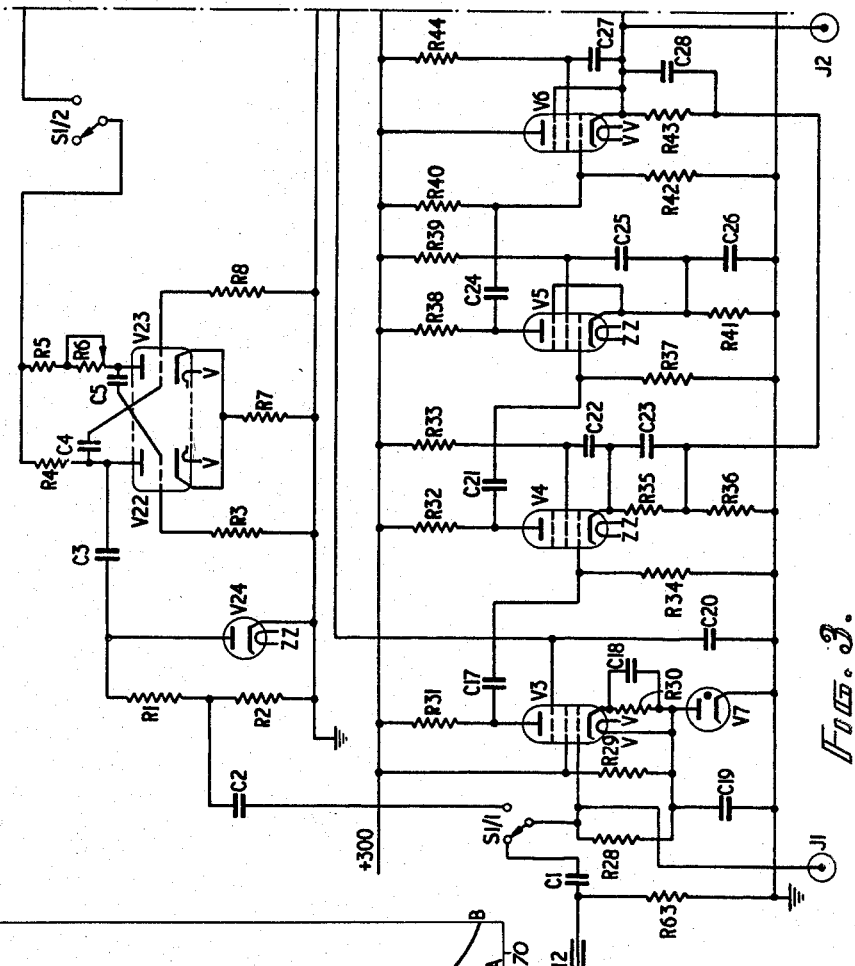
Figure 2 is a somewhat simplified circuit diagram of a photo-multiplier stage with its head amplifier.

In the circuit diagrams of Figures 2 and 3 of the drawings it will be seen that the individual valves stages operate in a manner which will be readily apparent to those skilled in the art; these circuits have not, therefore, been described in detail, but in the drawing the various resistors of Figure 2 bear references R1 to R17, and the capacitors C1 to C3, and in Figure 3 the resistors, and capacitors, of which some have already been referred to, bear references R1 to R63, and C1 to C36 respectively.

In Figure 2, these components had the following values:

*Capacitors*

| | | |
|---|---|---|
| C1 | pf | 50 |
| C2 | pf | 50 |
| C3 | mf | .001 |

*Resistors (Ohms)*

| | |
|---|---|
| R1 to R11 | 1M |
| R12 | 1M |
| R13 | 20K |
| R14 | 100K |
| R15 | 150 |
| R16 | 1K |
| R17 | 22K |

In Figure 3 these components had the following values:

Capacitors

| | | | | | |
|---|---|---|---|---|---|
| C1 | mf | .001 | C19 | mf | .001 |
| C2 | mf | .001 | C20 | mf | 8 |
| C3 | pf | 10 | C21 | mf | .1 |
| C4 | pf | 500 | C22 | mf | .01 |
| C5 | pf | 500 | C23 | mf | .1 |
| C6 | mf | .001 | C24 | mf | .01 |
| C7 | pf | 50 | C25 | mf | .1 |
| C8 | mf | .1 | C26 | mf | .1 |
| C9 | mf | .1 | C27 | mf | .1 |
| C10 | mf | .1 | C28 | pf | 5 |
| C11 | pf | 5 | C29 | mf | .001 |
| C12 | pf | 5 | C30 | pf | 50 |
| C13 | mf | .001 | C31 | pf | 10 |
| C14 | mf | .1 | C32 | pf | 18 |
| C15 | mf | .1 | C33 | mf | .002 |
| C16 | mf | .001 | C34 | mf | .1 |
| C17 | mf | .001 | C35 | mf | .01 |
| C18 | mf | .1 | C36 | mf | 4 |

Resistors (Ohms)

| | | | | |
|---|---|---|---|---|
| R1 | 33K | | R33 | 47K |
| R2 | 1K | | R34 | 220K |
| R3 | 220K | | R35 | 470 |
| R4 | 33K | | R36 | 100 |
| R5 | 22K | | R37 | 220K |
| R6 | 10K | | R38 | 10K |
| R7 | 10K | | R39 | 22K |
| R8 | 220K | | R40 | 220K |
| R9 | 5K | | R41 | 150 |
| R10 | 220K | | R42 | 47K |
| R11 | 100K | | R43 | 10K |
| R12 | 100K | | R44 | 47K |
| R13 | 50K | | R45 | 5K |
| R14 | 25K | | R46 | 47K |
| R15 | 25K | | R47 | 220K |
| R16 | 10K | | R48 | 10K |
| R17 | 25K | | R49 | 5K |
| R18 | 25K | | R50 | 47K |
| R19 | 47K | | R51 | 10K |
| R20 | 5K | | R52 | 10K |
| R21 | 50K | | R53 | 1M |
| R22 | 50K | | R54 | 1M |
| R23 | 5K | | R55 | 100K |
| R24 | 47K | | R56 | 100K |
| R25 | 10K | | R57 | 2.5K |
| R26 | 220K | | R58 | 100K |
| R27 | 1K | | R59 | 6.8K |
| R28 | 100K | | R60 | 100K |
| R29 | 33K | | R61 | 15K |
| R30 | 2K | | R62 | 47K |
| R31 | 5K | | R63 | 100 |
| R32 | 10K | | | |

The valves used were as follows:

V2, V4, V5, V6, V8, V9, V10, V11, V21; Type EF 80
V3; Type 6F32
V7; Type VR150
V12, V13, V17, V18; Type EB41
V14, V15, V22, V23; Type ECC35
V16, V24; Type EA50
V19, V20; Type ECC33

It may be observed that for successful operation the number of alpha pulses must be small compared with those due to the radiation to be counted at the output of the beta discriminator but large compared with the number of such pulses accepted by the alpha discriminator. In addition, the pulses due to the alpha particles must not be so large that they saturate the amplifier stages.

It is possible to omit the ancillary alpha particles source if it is possible to obtain from the output of the amplifier to be controlled a voltage which is a function of amplifier gain. If for example, a mixed source of beta and gamma radiation has to be used, as is almost always the case in practice due to Bremstrahlen, and the beta radiation is varied by the absorber or other effect being studied, whereas the harder gamma radiation is not, the crystal used will normally be too thin to absorb the maximum amount of energy from the hard gamma radiation. In this case, the pulse height curve will have a flat "tail" as at C in Figure 1, the shape of which is due to the fact that there will be a small number of high voltage pulses which are sensibly constant. In this case the tail of this curve can be used instead of the tail of the alpha particle curve.

The invention can be equally used to stabilize the voltage output from proportional counters, which is also a matter of some difficulty.

I claim:

1. Apparatus comprising a detector exposed to different types of radioactive radiation, one type being of substantially constant magnitude, an amplifier connected to said detector to respond quantitatively to varying radiation falling upon the same, discriminator means fed from said amplifier to produce two output voltages, one of which is a function of said radiation type of constant magnitude and thereby of the variation of the sensitivity of the apparatus, and means for controlling the gain of said amplifier in accordance with said one output voltage.

2. Apparatus comprising a detector exposed to radioactive radiation of two different types, an amplifier supplied with the output of said detector and responding quantitatively to varying radiation falling upon the same, discriminator means fed from said amplifier to produce two output voltages, one of which is a function of the variation of one type of radioactive radiation and the other of which is derived from the other type of radiation and is a function of the variation of the sensitivity of the apparatus, and means for controlling the gain of said amplifier in accordance with said other output voltage.

3. Apparatus comprising a detector of a radioactive energy exposed to a first radioactive radiation and to a second, monitor radioactive radiation of energy which is substantially constant and detectably different from that of the first radiation, an amplifier fed with the output of said detector and responding quantitatively to variations in the output, discriminator means fed from said amplifier and producing a first output voltage which is a function of energy variations in said first radiation and a second output voltage derived from said monitor radiation and being a function of variations in sensitivity of the apparatus, and means for controlling the gain of said amplifier in accordance with said second output voltage.

4. Apparatus as claimed in claim 3 wherein the second, monitor radiation is an alpha radiation.

5. Apparatus as claimed in claim 3 wherein the second, monitor radiation is a gamma radiation.

6. Apparatus as claimed in claim 3 wherein said detector is of the scintillation type.

7. Apparatus for measuring the intensity of radioactive materials comprising a detector responsive quantitatively to substantially constant alpha radiation and varying beta radiation falling upon the same, said alpha radiation being detectably different from said beta radiation, an amplifier fed with the output of said detector and responding quantitatively to variations in said detector output, discriminator means fed from the output of said amplifier for producing a first output voltage which is a function of energy variations of said beta radiation and also a second output voltage which is a function of energy variations in said substantially constant alpha radiation and thus a function of variations in sensitivity of the apparatus, and means for controlling the gain of said amplifier in accordance with said second output voltage.

(References on following page)

References Cited in the file of this patent

UNITED STATES PATENTS

| | | |
|---|---|---|
| 2,259,906 | Neustadt | Oct. 21, 1941 |
| 2,289,338 | Bertram et al. | July 14, 1942 |
| 2,531,467 | Reade | Nov. 28, 1950 |
| 2,576,661 | Wouters | Nov. 27, 1951 |
| 2,583,143 | Glick | Jan. 22, 1952 |
| 2,648,012 | Scherbatskoy | Aug. 4, 1953 |
| 2,659,011 | Youmans | Nov. 10, 1953 |
| 2,662,188 | Crumrine et al. | Dec. 8, 1953 |
| 2,676,268 | Schorr | Apr. 20, 1954 |
| 2,681,416 | Thompson | June 15, 1954 |

FOREIGN PATENTS

| | | |
|---|---|---|
| 611,390 | Great Britain | Oct. 28, 1948 |